(12) United States Patent
Javli et al.

(10) Patent No.: US 7,693,756 B2
(45) Date of Patent: Apr. 6, 2010

(54) METHOD AND SYSTEM FOR DETERMINING ABSORPTION COSTS FOR TRANSFERS BETWEEN INVENTORY SITES OF A BUSINESS OPERATION

(75) Inventors: Veeresha Javli, Redwood City, CA (US); Lina C. Velasquez, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 710 days.

(21) Appl. No.: 11/393,135

(22) Filed: Mar. 29, 2006

(65) Prior Publication Data

US 2006/0200428 A1 Sep. 7, 2006

(51) Int. Cl.
*G06F 17/60* (2006.01)
(52) U.S. Cl. .............................. 705/28; 705/1; 705/29; 705/26; 705/37; 705/39; 705/400
(58) Field of Classification Search ............. 705/28–29, 705/1, 26, 37, 39, 400
See application file for complete search history.

(56) References Cited

U.S. PATENT DOCUMENTS

2003/0172008 A1* 9/2003 Hage et al. .................... 705/28
2004/0010463 A1* 1/2004 Hahn-Carlson et al. ....... 705/39

* cited by examiner

*Primary Examiner*—Vanel Frenel
(74) *Attorney, Agent, or Firm*—Townsend and Townsend and Crew LLP

(57) ABSTRACT

Embodiments of the present invention are directed to a computer-implemented method for determining absorption costs for transfers between a plurality of cost groups of a business operation. In one embodiment, a processing sequence for the plurality of cost groups is determined. For iteration (n) where n>1, a periodic moving average cost of a transferable item is then calculated for each of the plurality of cost groups according to the processing sequence, where the transferable item is to be transferred between the plurality of cost groups. A difference between the periodic moving average cost calculated in iteration (n) for each of the plurality of cost groups and a periodic moving average cost calculated in iteration (n−1) for each of the plurality of cost groups is then calculated. The steps of calculating the periodic moving average cost and calculating the difference are then repeated until the difference is within a specified tolerance.

21 Claims, 9 Drawing Sheets

METHOD AND SYSTEM FOR DETERMINING ABSORPTION COSTS FOR TRANSFERS BETWEEN INVENTORY SITES OF A BUSINESS OPERATION

FIELD OF THE INVENTION

Embodiments of the present invention are related to the field of determining the cost of a transfer of goods between cost groups.

BACKGROUND OF THE INVENTION

Transferring goods between inventory sites is a common business practice for most all companies. Goods are often comprised of sub-assemblies of smaller items, which must be transferred from one inventory site to another in the process of manufacturing and distributing the goods. As such, the appropriate valuation and analysis of transferable item costs has become a key factor in successful business management. Although several costing methods exist, absorption costing is commonly used.

Absorption costing is an approach to inventory valuation that involves assigning a cost to each transferable item in inventory, where the cost is determined by summing the value of the items transferred and any freight or other charges incurred as a result of the transfer. Most all companies use computer software to perform the absorption costing analysis for transfers between various inventory sites, which commonly refer to inventory sites as "cost groups." The software will perform the necessary operations to determine the average cost of the item at both the transferring and receiving cost groups. Although the number of operations may be relatively few in simple scenarios, the manufacture and distribution of a good often creates more complex scenarios where many items are transferred between many different locations. Consequently, the number of operations that the software must perform in these more complex scenarios may become very large.

SUMMARY OF THE INVENTION

Accordingly, a need exists for a computer-implemented method and system that more efficiently determines absorption costs for transfers of items between cost groups. Furthermore, there is a need to reduce the number of calculations necessary to perform tolerance verification to ensure that the cost of the transferred items at each of the cost groups sufficiently absorb the costs incurred as a result of the transfers between the cost groups. Embodiments of the present invention provide novel solutions to these needs and others as described below.

Embodiments of the present invention are directed to a method and system for determining absorption costs for transfers between a plurality of cost groups of a business operation. More specifically, embodiments provide an efficient mechanism for determining when a computed absorption cost satisfies a particular tolerance and is therefore reportable. In one embodiment, a processing sequence for the plurality of cost groups is determined. Thereafter, an iterative method is performed involving the calculation of a periodic moving average cost for each of the cost groups between which a transferable item is transferred and the calculation of a difference between the periodic moving average cost of the current iteration (n) and the periodic moving average cost of the previous iteration (n−1). The iterative method is repeated until the difference is within a specified tolerance. Therefore, tolerance checking is performed at the completion of an iteration and not performed throughout the iteration.

In another embodiment, a computer-usable medium having computer-readable program code causes a computer system to perform a method in accordance with the previously-discussed embodiments. And in another embodiment, a computer system enables instructions stored in a memory to be executed on a processor to implement a method in accordance with the previously-discussed embodiments.

More specifically, one embodiment of the present invention pertains to a computer-implemented method for determining absorption costs for transfers between a plurality of cost groups of a business operation. The method includes: a) determining a processing sequence for the plurality of cost groups; b) for iteration (n) where n>1, calculating a periodic moving average cost of a transferable item for each of the plurality of cost groups according to the processing sequence, wherein the transferable item is to be transferred between the plurality of cost groups; c) calculating a difference between the periodic moving average cost calculated in iteration (n) for each of the plurality of cost groups and a periodic moving average cost calculated in iteration (n−1) for each of the plurality of cost groups; and d) repeating steps b) and c) until the difference is within a specified tolerance.

Other embodiments of the present invention include the above, and wherein the calculating the periodic moving average cost further comprises: processing transfer receipts by determining an adjusted periodic moving average cost of each cost group from which the transferable item is transferred, wherein the determining an adjusted periodic moving average cost further comprises: adding a periodic moving average cost calculated in the iteration (n) for each of the cost groups from which the transferable item is transferred to any other charges incurred as a result of transferring the transferable item; if the periodic moving average cost calculated in the iteration (n) is not available, then adding the periodic moving average cost calculated in the iteration (n−1) to any other charges incurred as a result of transferring the transferable item; and if neither the periodic moving average cost calculated in the iteration (n) nor the periodic moving average cost calculated in the iteration (n−1) is available, then adding a pre-determined value to any other charges incurred as a result of transferring the transferable item; and calculating the periodic moving average cost utilizing a plurality of the adjusted periodic moving average costs.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "defining," "determining," "performing," "processing," "comparing," "repeating," "creating," "establishing," "using," "calculating," "adding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

EMBODIMENTS OF THE INVENTION

Figure 1:
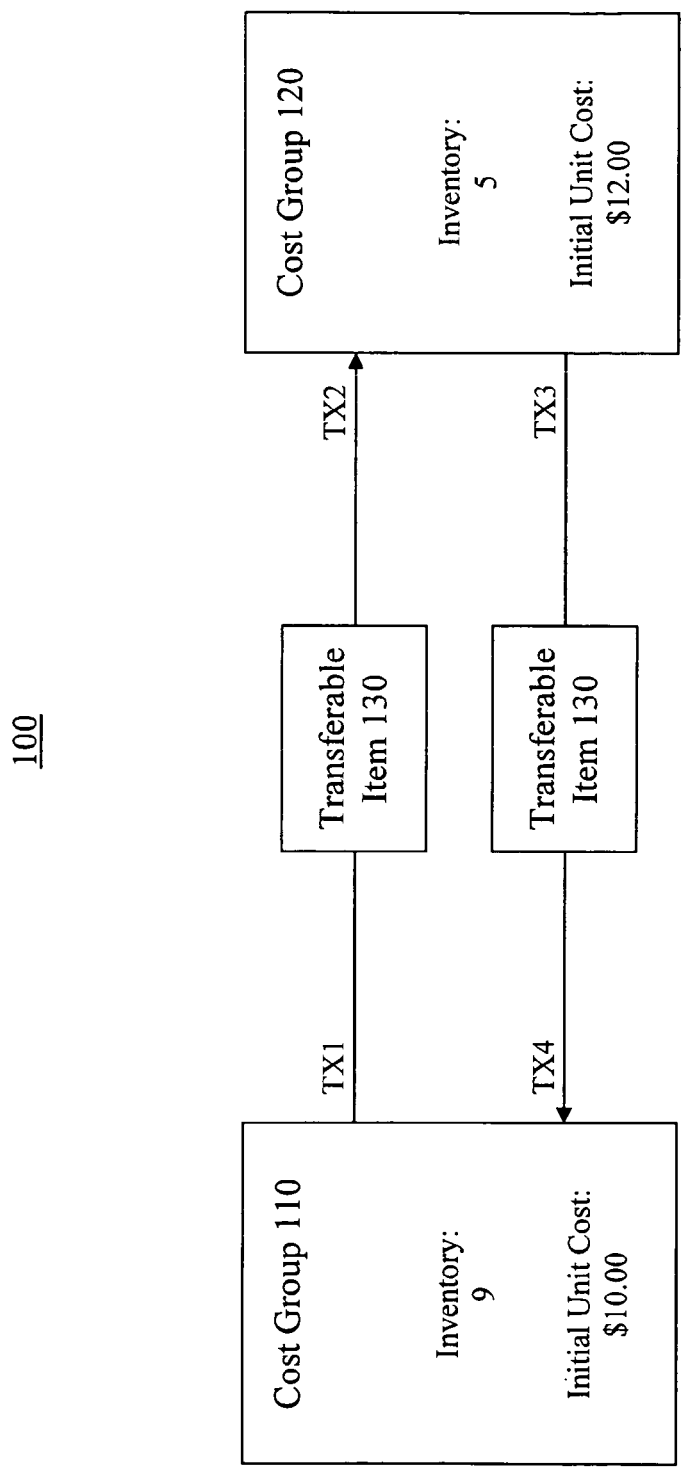
FIG. 1 shows a block diagram depicting a plurality of exemplary cost groups transferring an item in accordance with one embodiment of the present invention.

FIG. 1 shows block diagram 100 depicting a plurality of exemplary cost groups transferring an item in accordance with one embodiment of the present invention. As shown in FIG. 1, cost groups 110 and 120 transfer items (e.g., transferable item 130) between one another. Prior to the transfers, cost group 110 has an inventory of nine items (e.g., transferable item 130), each with an initial unit cost of $10. Cost group 120 has an inventory of five items (e.g., transferable item 130) prior to the transfers, each with an initial unit cost of $12. In one embodiment, cost groups 110 and 120 may be inventory sites of a corporation (e.g., manufacturing plants, warehouses, etc.).

As shown in FIG. 1, cost group 110 transfers transferable item 130 to cost group 120. Cost group 120 then transfers transferable item 130 to cost group 110. More specifically, cost group 110 generates a transfer shipment (TX1) of transferable item 130. Upon receipt of transferable item 130, cost group 120 generates transfer receipt (TX2). Cost group 120 then generates a transfer shipment (TX3) of transferable item 130. Upon receipt of transferable item 130, cost group 110 generates transfer receipt (TX4). In one embodiment, transferable item 130 is a plurality of items transferred between cost groups. As such, in one embodiment cost groups 110 and 120 may transfer equal numbers of an item (e.g., transferable item 130), and in other embodiments, the cost groups may transfer unequal numbers of an item. For example, while cost group 110 may transfer three items to cost group 120, cost group 120 may only transfer 2 items to cost group 110.

Figure 2:
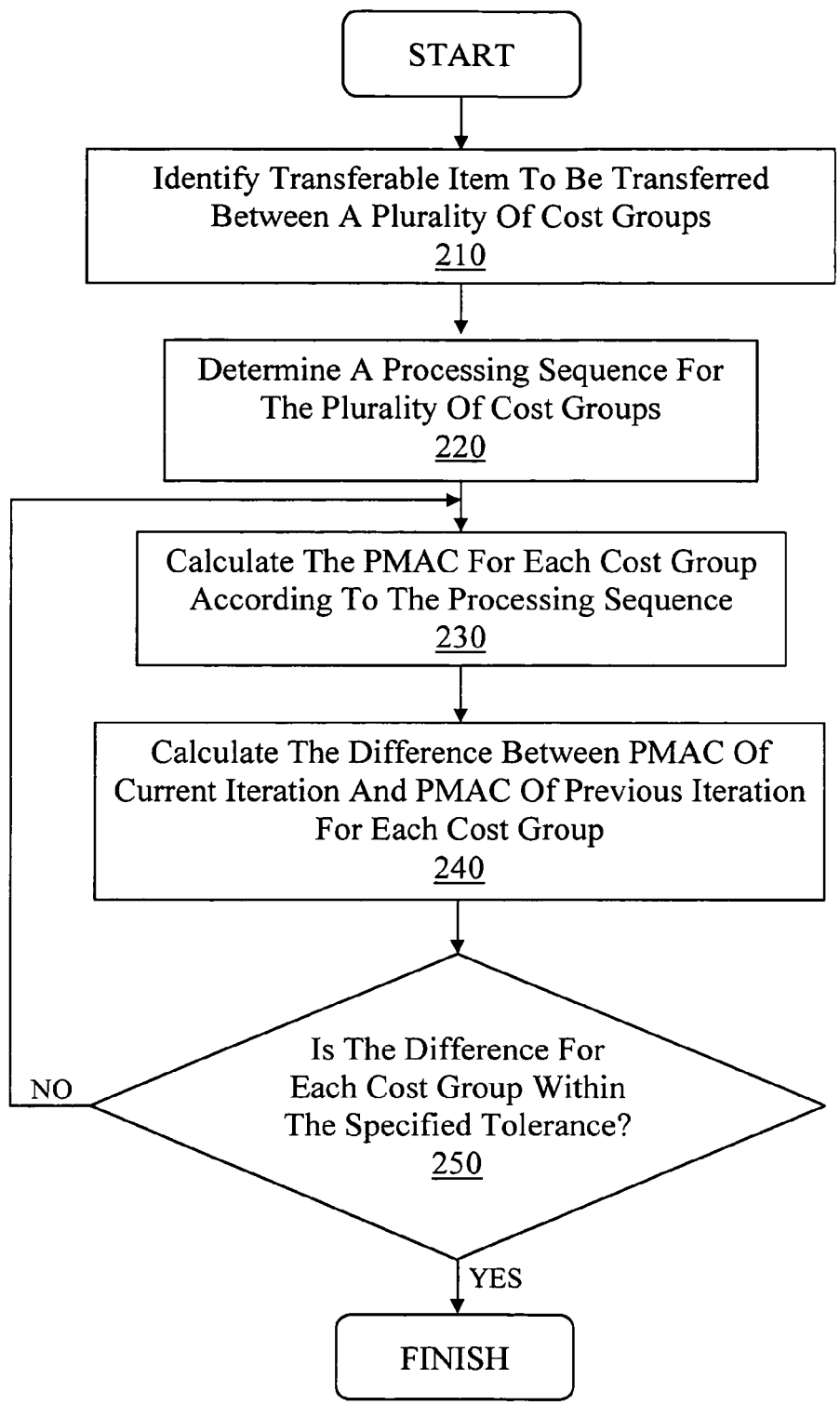
FIG. 2 shows a computer-implemented process for determining absorption costs for transfers between a plurality of cost groups of a business operation in accordance with one embodiment of the present invention.

FIG. 2 shows computer-implemented process 200 for determining absorption costs for transfers between a plurality of cost groups of a business operation in accordance with one embodiment of the present invention. As the steps of process 200 are described herein, reference will be made to FIG. 1 to provide examples and help clarify the discussion.

As shown in FIG. 2, step 210 involves the identification of a transferable item (e.g., transferable item 130 depicted in FIG. 1) to be transferred between a plurality of cost groups (e.g., cost groups 110 and 120 of FIG. 1). In accordance with embodiments of the present invention, it should be understood that a plurality of the transferable item may be transferred between cost groups as discussed above with respect to FIG. 1. Also, although FIG. 1 shows only two exemplary cost groups, it should be understood that more than two cost groups may transfer items in other embodiments. Additionally, in one embodiment, the transferable item identified in step 210 may be one of a plurality of transferable items (e.g., items in a bill of materials comprising an assembly or subassembly).

Step 220 of process 200 involves the determination of a processing sequence for the plurality of cost groups transferring the transferable item identified in step 210. In one embodiment, the processing sequence is determined by initially grouping the cost groups into cost groups sets based upon whether the cost groups only transfer items, transfer and receive items, or only receive items. In another embodiment, the cost group sets are then sequenced. And in another embodiment, the cost groups are then sequenced within each of the cost group sets. Thus, in one embodiment, the processing sequence determined in step 220 may be derived from both the cost group set sequencing and the cost group sequencing.

Referring to FIG. 2, step 230 involves the calculation of the periodic moving average cost (PMAC) for each of the plurality of cost groups transferring the transferable item identified in step 210. For example, in one embodiment, the PMAC for the first cost group in the processing sequence (e.g., the processing sequence of step 220) would be calculated, followed by the calculation of the PMAC for the second cost group in the processing sequence, and so on until the PMAC for each of the cost groups in the processing sequence has been calculated.

A PMAC for a given cost group may be calculated in one embodiment in accordance with step 230 using the following formula:

PMAC=[(Prior Cost*Prior Quantity)+Σ(Transfer Receipt Quantity*Adjusted PMAC of Transferring Cost Group)]/(Prior Quantity+ΣTransfer Receipt Quantity)

In one embodiment, the previous period cost is the item cost determined for the given cost group in the previous period. The received quantity is the quantity of items received by the given cost group prior to the start of the current period. And the unit cost is the estimated price or the vendor's invoice price representing the unit price of the transferable item at the end of the previous period for the given cost group. As such, in another embodiment, the prior cost is the cost of a transferable item at the given cost group at the beginning of the current period, and the prior quantity is the quantity of an item that the given cost group has in inventory at the beginning of a period before any items are transferred to or from the given cost group.

Referring again to the formula for calculating a PMAC presented above, the transfer receipt quantity is the quantity of an item received by the given cost group from another cost group (e.g., the "transferring cost group") in the current period, in one embodiment of the present invention. In one embodiment, the adjusted PMAC of the transferring cost group is the sum of the PMAC calculated in the current iteration of the processing sequence for the transferring cost group plus any other charges incurred as a result of transferring the items. In another embodiment where the PMAC of the transferring cost group has not been calculated in the current iteration, the adjusted PMAC of the transferring cost group is the sum of the PMAC calculated in the previous iteration of the processing sequence for the transferring cost group plus any other charges incurred as a result of transferring the items. In another embodiment where the PMAC of the transferring cost group has not been calculated in either the current or previous iteration, then the adjusted PMAC of the transferring cost group is the sum of a predetermined value (e.g., the PMAC of the transferring cost group at the end of the previous period) plus any other charges incurred as a result of transferring the items.

Although the above discussion of step 230 has focused primarily on embodiments involving transfers from a single transferring cost group, it should be understood that a plurality of cost groups may transfer items to the given cost group. As such, in another embodiment, the product of the quantity received from a transferring cost group and the PMAC of that transferring cost group must be summed for all transferring cost groups as shown in the numerator of the PMAC formula presented above. Likewise, the quantity received from each of the transferring cost groups should be summed as shown in the denominator of the PMAC formula presented above.

Referring now to step 240 of FIG. 2, the difference between the PMAC of the current iteration and the PMAC of the previous iteration is calculated for each cost group either transferring or receiving the transferable item. In one embodiment, step 240 is not performed where a PMAC of a previous iteration does not exist (e.g., the first iteration). It should be understood that by not calculating this difference during the first iteration (as described in the copending patent application Ser. No. 11/019,346), many operations can be saved (e.g., when there are many cost groups performing many transfers to the given cost group) over conventional processes that perform tolerance verification in each iteration. Thus, embodiments of the present invention improve the efficiency of process 200.

Step 250 involves comparing the difference calculated in step 240 for each of the cost groups with a specified tolerance. In one embodiment, the tolerance may be supplied by a user of a computer system performing process 200. In another embodiment, the tolerance may be dynamically generated by the computer system or computer-readable code performing process 200. If the tolerance for any cost group is not met, then steps 230 and 240 should be repeated until the difference for each cost group is within the specified tolerance. Once the difference for each cost group is within the specified tolerance, process 200 ends.

Figure 5:
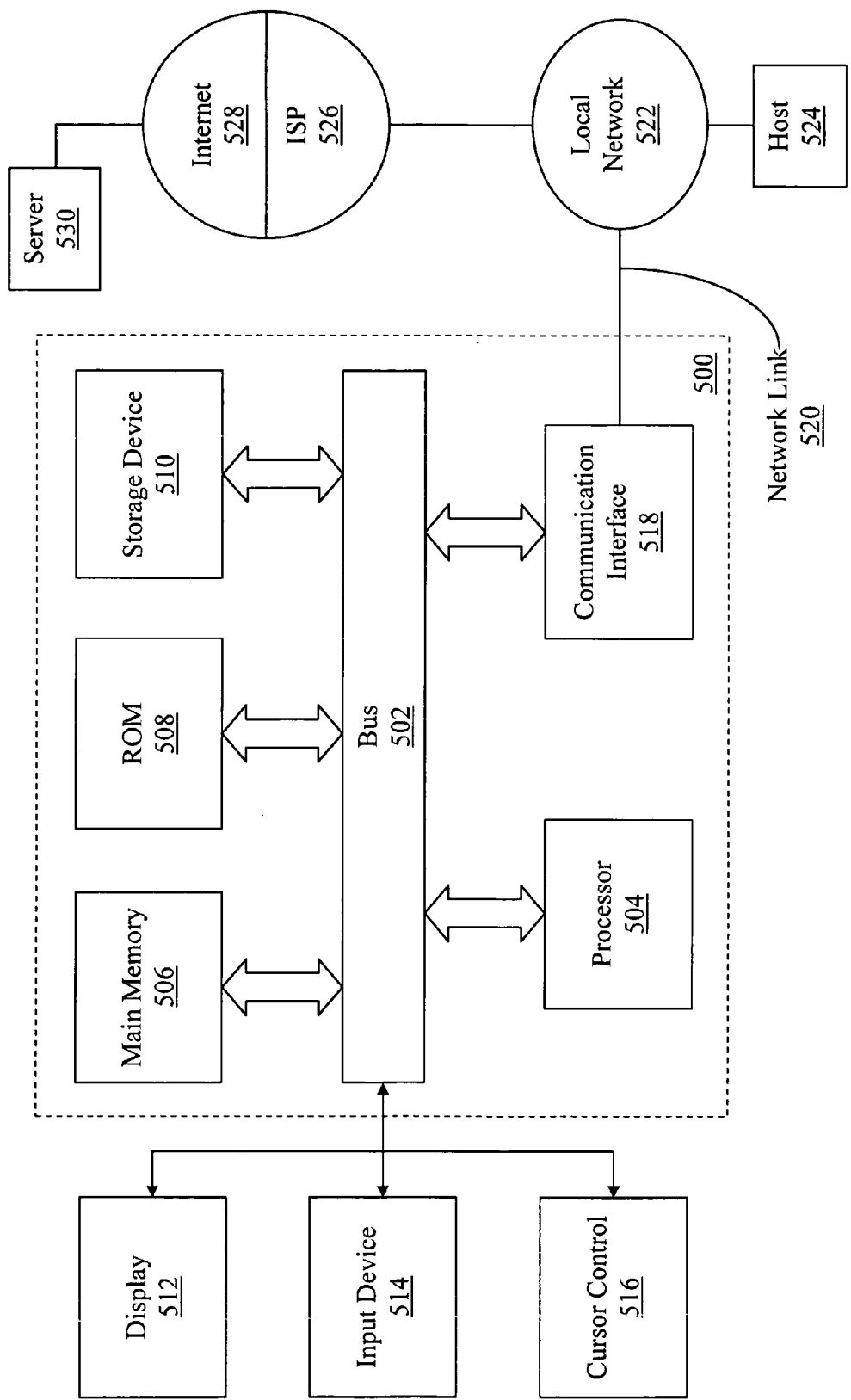
FIG. 5 shows an exemplary computer system upon which embodiments of the present invention may be implemented.

In one embodiment of the present invention, process 200 may be performed on a computer system (e.g., computer system platform 500 depicted in FIG. 5). Processor 504 coupled to bus 502 may perform process 200 by the execution of instructions fetched from various memory devices. In one embodiment, process 200 may comprise instructions located in main memory 506. In another embodiment, ROM 508 may contain instructions for performing process 200. In another embodiment, processor 504 may fetch instructions from storage device 510 to perform process 200. And in another embodiment, instructions comprising process 200 may be fetched from registers within processor 504 (not shown in FIG. 5).

Although process 200 shown in FIG. 2 may be implemented using a variety of programming languages, the following pseudo-code is an exemplary implementation of process 200 in accordance with embodiments of the present invention.

```
Identify items with transfers across cost groups.
For each item transferred across cost groups;
LOOP
    Identify the cost groups which have transferred the item;
    Determine the optimal sequence in which cost groups should be
        processed;
END LOOP
Perform iteration process;
For each item;
LOOP
    For each iteration;
    LOOP
        For each cost group according to the optimal sequence;
        LOOP
            If the iteration is the first iteration:
                a) Process transfer receipts
                    as cost-owned transactions
                    respecting Freight-On-Board points;
                b) Calculate the PMAC of the item;
                c) Process transfer shipments as
                    cost-derived transactions;
``` d) Assign the PMAC of the item to shipments,
            which is the item cost of the shipping
            cost group for the iteration;
    End if first iteration.
    If the iteration is subsequent to the first iteration:
        a) Process transfer receipts as
            cost-owned transactions
            respecting Freight-On-Board points;
        b) Recalculate the PMAC of the item;
        c) Process transfer shipments as
            cost-derived transactions;
        d) Assign the recalculated PMAC
            of the item to shipments,
            which is the item cost of the
            shipping cost group
            for the iteration;
    End if iteration subsequent to first iteration.
    END COST GROUP LOOP.
    Calculate the difference between the PMAC of the item in the
        current iteration and the previous iteration;
    Verify the tolerance:
        If the tolerance is achieved for all
            the cost groups, then END
                ITERATION LOOP;
        If the tolerance is not achieved for any
            of the cost groups, then
                BEGIN NEXT ITERATION;
    END ITERATION LOOP.
END ITEM LOOP.

To further illustrate this exemplary implementation of process 200, the above pseudo-code will be applied to the scenario depicted in FIG. 1. For purposes of the following illustration, it will be assumed that transferable item 130 comprises a single item transferred between cost groups 110 and 120, where no additional charges are incurred as a result of the transfers. It will also be assumed that the optimal processing sequence will be in order of descending inventory, and thus, cost group 110 shall be processed before cost group 120. It will be further assumed that the specified tolerance is 0.00000. Also, the equation discussed above with respect to step 230 of FIG. 2 will be used for all PMAC calculations.

FIRST ITERATION

1) Cost group 110 periodic cost calculation:
    a) Process transfer receipt TX4.
        Transfer receipt TX4 should absorb the cost of TX3 plus
        any other applicable freight or other charges incurred as
        result of the transfer. Since, there are no freight or
        other charges incurred in this example, TX4 takes the
        value of TX3. Therefore, TX4 = $12.00.
    b) Calculate the PMAC of cost group 110.
        PMAC = (($10.00 * 9) + ($12.00 * 1))/(9 + 1) = $10.20000
    c) The PMAC of cost group 110 is assigned to the
        corresponding transfer shipment.
        TX1 takes the value of the new PMAC of cost group 110.
        Therefore, TX1 = $10.20000.
2) Cost group 120 periodic cost calculation:
    a) Process transfer receipt TX2.
        Transfer receipt TX2 should absorb the cost of TX1 plus
        any other applicable freight or other charges incurred as
        a result of the transfer. Since, there are no freight or
        other charges incurred in this example, TX2 takes the
        value of TX1. Therefore, TX2 = $10.20000.
    b) Calculate the PMAC of cost group 120.
        PMAC = (($12.00 * 5) + $10.20000 * 1))/(5 + 1) = $11.700000
    c) The PMAC of cost group 120 is assigned to the
        corresponding transfer shipment.
        TX3 takes the value of the new PMAC of cost group 120.
        Therefore, TX3 = $11.700000.
3) Tolerance check:
    No tolerance verification will be performed in the first iteration
    since it requires at least two iterations to compare.

SECOND ITERATION

1) Cost group 110 periodic cost calculation:
    a) Process transfer receipt TX4.
        Transfer receipt TX4 should absorb the cost of TX3 plus
        any other applicable freight or other charges incurred as
        a result of the transfer. Since, there are no freight or
        other charges incurred in this example, TX4 takes the
        value of TX3. Therefore, TX4 = $11.700000.
    b) Calculate the PMAC of cost group 110.
        PMAC = (($10.00 * 9) + ($11.700000 * 1))/(9 + 1) = $10.170000
    c) The PMAC of cost group 110 is assigned to the
        corresponding transfer shipment.
        TX1 takes the value of the new PMAC of cost group 110.
        Therefore, TX1 = $10.170000.
2) Cost group 120 periodic cost calculation:
    a) Process transfer receipt TX2.
        Transfer receipt TX2 should absorb the cost of TX1 plus
        any other applicable freight or other charges incurred as
        a result of the transfer. Since, there are no freight or
        other charges incurred in this example, TX2 takes the
        value of TX1. Therefore, TX2 = $10.170000.
    b) Calculate the PMAC of cost group 120.
        PMAC = (($12.00 * 5) + $10.170000 * 1))/(5 + 1) = $11.695000
    c) The PMAC of cost group 120 is assigned to the
        corresponding transfer shipment.
        TX3 takes the value of the new PMAC of cost group 120.
        Therefore, TX3 = $11.695000.
3) Tolerance check:
    Is |PMAC of iteration (n) – PMAC of iteration (n-1)| < specified
    tolerance, where n is the iteration number?
    For cost group 110: |10.170000 – 10.20000| = 0.03000
        (tolerance not met)
    For cost group 120: |11.695000 – 11.700000| = 0.00500
        (tolerance not met)

Thus, the above process will continue for five iterations until the tolerance is achieved for all cost groups. Table 1 below shows a summary of the transaction values and the PMAC for each cost group after each iteration. Table 2 below shows the PMAC difference for each cost group after each iteration. As shown for iteration five, the PMAC difference for both cost group 110 (0.000000) and cost group 120 (0.000045) is less than or equal to the specified tolerance of 0.00000. Therefore, the tolerance is achieved for all cost groups after iteration five.

TABLE 1

| Iteration | TX4 | TX1 | TX2 | TX3 | Cost Group 110 | Cost Group 120 |
|---|---|---|---|---|---|---|
| 1 | 12.00000 | 10.200000 | 10.200000 | 11.700000 | 10.200000 | 11.700000 |
| 2 | 11.700000 | 10.170000 | 10.170000 | 11.695000 | 10.170000 | 11.695000 |
| 3 | 11.695000 | 10.169500 | 10.169500 | 11.694917 | 10.169500 | 11.694917 |
| 4 | 11.694917 | 10.169492 | 10.169492 | 11.694915 | 10.169492 | 11.694915 |
| 5 | 11.694915 | 10.169492 | 10.169492 | 11.694915 | 10.169492 | 11.694915 |

TABLE 2

| Iteration | Cost Group 110 | Cost Group 120 | PMAC Difference For Cost Group 110 | PMAC Difference For Cost Group 120 |
|---|---|---|---|---|
| 1 | 10.200000 | 11.700000 | No Tolerance Check | No Tolerance Check |
| 2 | 10.170000 | 11.695000 | 0.03000 | 0.00500 |
| 3 | 10.169500 | 11.694917 | 0.00050 | 0.00008 |
| 4 | 10.169492 | 11.694915 | 0.00001 | 0.00000 |
| 5 | 10.169492 | 11.694915 | 0.00000 | 0.00000 |

Figure 3:
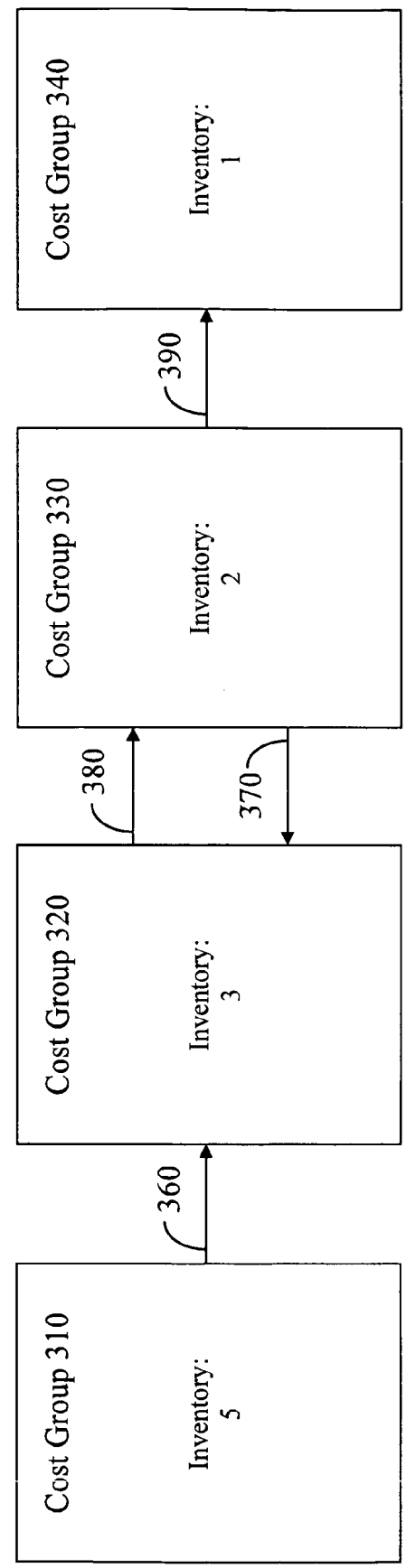
FIG. 3 shows a block diagram depicting a plurality of exemplary cost groups transferring an item in accordance with one embodiment of the present invention.

FIG. 3 shows block diagram 300 depicting a plurality of exemplary cost groups transferring an item in accordance with one embodiment of the present invention. As shown in FIG. 3, cost groups 310, 320, 330 and 340 transfer items (e.g., transferable item 130 of FIG. 1) between one another. More specifically, cost group 320 will generate a transfer receipt for both items transferred from cost group 310 (e.g., via transfer 360) and cost group 330 (e.g., via transfer 370). Cost group 330 will generate a transfer receipt for items transferred from cost group 320 (e.g., via transfer 380). And cost group 340 will generate a transfer receipt for items transferred from cost group 330 (e.g., via transfer 390). Prior to the transfers, cost group 310 has an inventory of five items, cost group 320 has an inventory of three items, cost group 330 has an inventory of two items, and cost group 340 has an inventory of one item. In one embodiment, cost groups 310-340 may be inventory sites of a corporation (e.g., manufacturing plants, warehouses, etc.).

FIGS. 4A, 4B, 4C, 4D and 4E show computer-implemented process 400 for determining absorption costs for transfers between a plurality of cost groups of a business operation in accordance with one embodiment of the present invention. As the steps of process 400 are described herein, reference will be made to FIG. 3 to provide examples and help clarify the discussion.

Figure 4A:
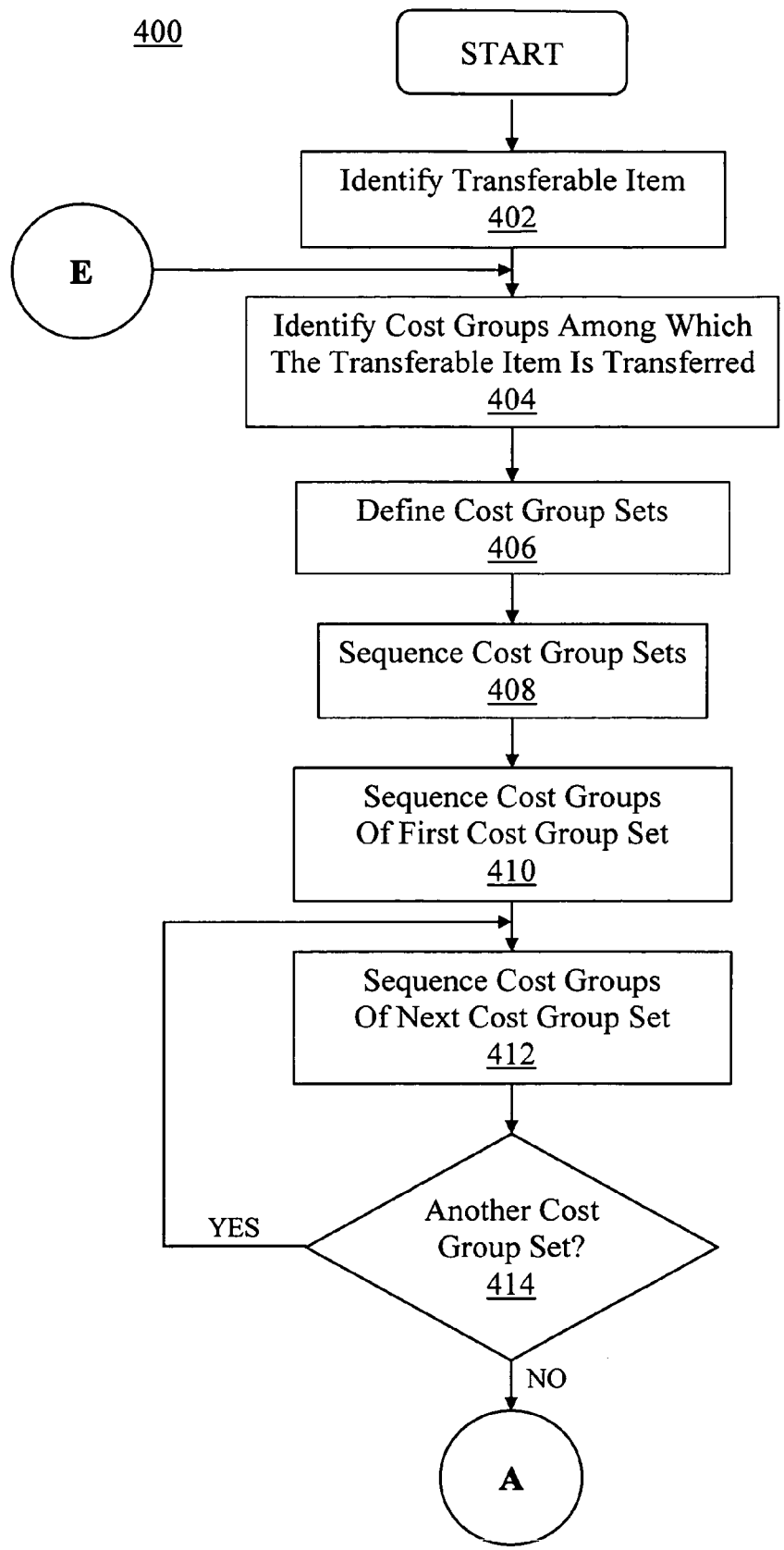
FIG. 4A shows a portion of a computer-implemented process for identifying a transferable item and determining a processing sequence for a plurality of cost groups between which the transferable item is transferred in accordance with one embodiment of the present invention.

FIG. 4A shows a portion of process 400 for identifying a transferable item and determining a processing sequence for a plurality of cost groups between which the transferable item is transferred in accordance with one embodiment of the present invention. As shown in FIG. 4A, step 402 involves the identification of a transferable item to be transferred between a plurality of cost groups (e.g., cost groups 310-340 of FIG. 3). In accordance with embodiments of the present invention, it should be understood that a plurality of the transferable item may be transferred between cost groups. Additionally, in one embodiment, the transferable item identified in step 402 may be one of a plurality of transferable items (e.g., items in a bill of materials comprising an assembly or subassembly).

After a transferable item is identified, cost groups between which the transferable items are transferred are then identified in step 404. The cost groups identified in step 404 may receive and/or transfer the transferable items. Additionally, as discussed above with respect to other embodiments, the cost groups identified in step 404 may be inventory sites of a corporation (e.g., manufacturing plants, warehouses, etc.).

As shown in FIG. 4A, cost group sets are then defined in step 406. In one embodiment, the cost groups identified in step 404 are grouped into cost groups sets based upon whether the cost groups only transfer items (e.g., a first cost group set), transfer and receive items (e.g., a second cost group set), or only receive items (e.g., a third cost group set). For example, referring to cost groups 310-340 shown in FIG. 3, the first cost group set would comprise only cost group 310 since cost group 310 only transfers items. The second cost group set would comprise cost groups 320 and 330 since cost groups 320 and 330 both transfer and receive items. And the third cost group set would comprise only cost group 340 since cost group 340 only receives items.

After the cost group sets are defined, the cost group sets are sequenced in step 408. In one embodiment, the cost groups sets may be sequenced in the following order: first cost group set, second cost group set, and then third cost group set. Thus, the cost groups within the first cost group set would be processed first, the cost groups within the second cost group set would be processed second, and the cost groups within the third cost group set would be processed third. In other embodiments, alternative cost group set sequences may be utilized.

As shown in FIG. 4A, the cost groups within the first cost group are sequenced in step 410. In one embodiment, the cost groups within the first cost group set may be sequenced according to ascending inventory of the transferable item. In other embodiments, the cost groups within the first cost group set may be sequenced according to descending inventory of the transferable item. And in other embodiments, alternative cost group sequences may be utilized. Further, in other embodiments where there is only one cost group in the first cost group set (e.g., cost group 310 of FIG. 3), step 410 need not be performed as there are not multiple cost groups to sequence.

After the cost groups of the first cost group set are sequenced, the cost groups of the next cost group set (e.g., as determined in step 408) are sequenced in step 412. In one embodiment, the cost groups within the next cost group set may be sequenced according to ascending inventory of the transferable item. For example, referring to FIG. 3 where cost groups 320 and 330 are in the second cost group set in one embodiment, cost group 330 would be processed before cost group 320 since cost group 330 has fewer transferable items in inventory. In other embodiments, the cost groups within the first cost group set may be sequenced according to descending inventory of the transferable item. For example, referring to FIG. 3 where cost groups 320 and 330 are in the second cost group set in one embodiment, cost group 320 would be processed before cost group 330 since cost group 320 has more transferable items in inventory. And in other embodiments, alternative cost group sequences may be utilized. Further, in other embodiments where there is only one cost group in the next cost group set, step 412 need not be performed as there are not multiple cost groups to sequence.

As shown in FIG. 4A, a determination is made in step 414 as to whether additional cost group sets exist that comprise cost groups that have not yet been sequenced. In one embodiment, if additional cost group sets exist that comprise cost groups that have not yet been sequenced, step 412 is repeated for the next cost group set. In another embodiment, if all cost group sets have been sequenced, then step 420 of FIG. 4B is performed.

Figure 4B:
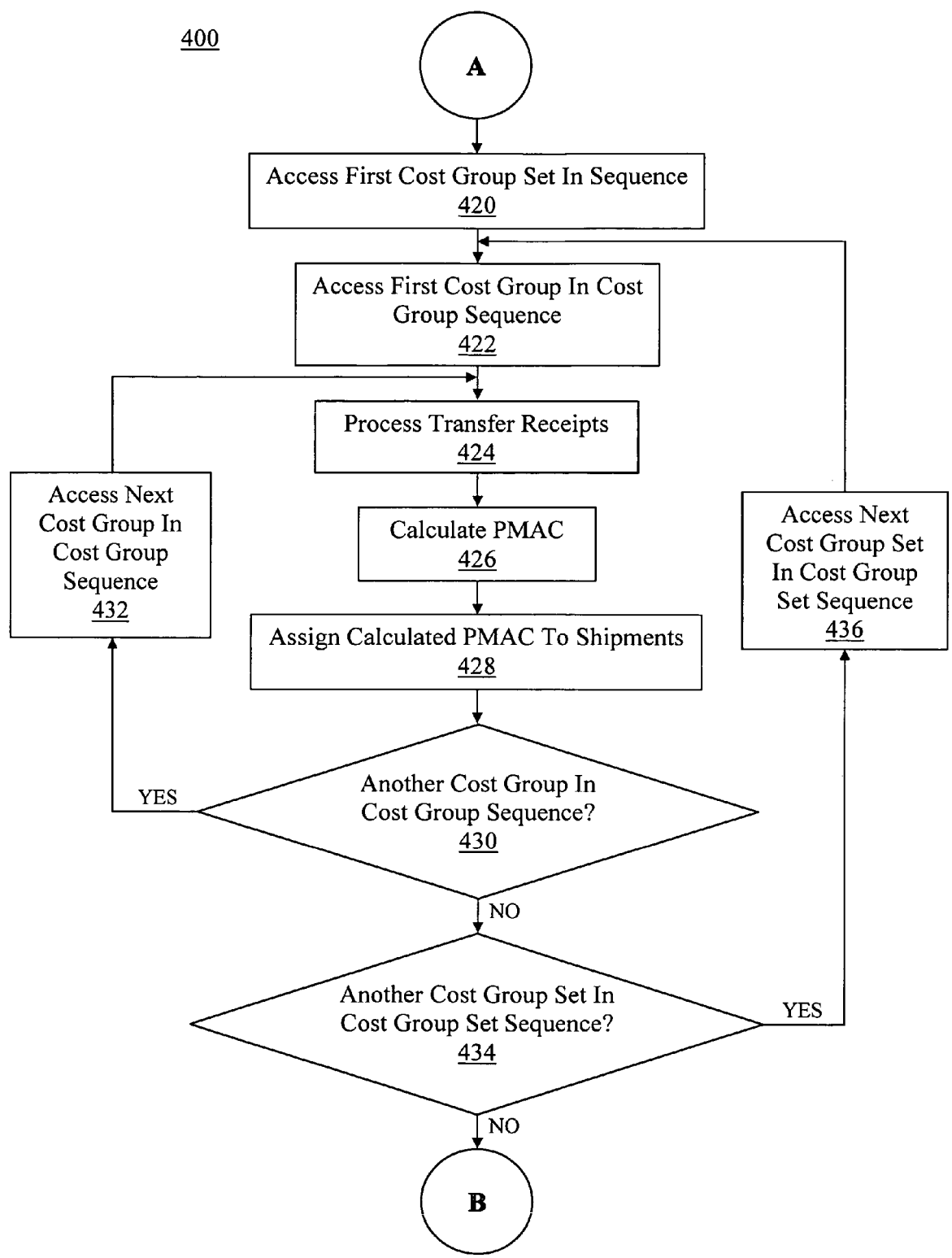
FIG. 4B shows a portion of a computer-implemented process for calculating a periodic moving average cost of a transferable item for a plurality of cost groups between which the transferable item is transferred in accordance with one embodiment of the present invention.

FIG. 4B shows a portion of process 400 for calculating a periodic moving average cost of a transferable item for a plurality of cost groups between which the transferable item is transferred in accordance with one embodiment of the present invention. As shown in FIG. 4B, the first cost group set (e.g., the first cost group set determined in step 408 of FIG. 4A) in the cost group set sequence (e.g., the sequence determined in step 408 of FIG. 4A) is accessed in step 420. After accessing the first cost group set, the first cost group in the first cost group set (e.g., cost group 310 of FIG. 3) is accessed in step 422.

As shown in FIG. 4B, step 424 involves processing the transfer receipts for the accessed cost group. In one embodiment, transfer receipts are processed by determining an adjusted PMAC for each transferring cost group. In general, the adjusted PMAC is the sum of the most-recent value for the PMAC of a transferring cost group and any other charges incurred as a result of the transfer to the accessed cost group (e.g., freight charges to ship the items from the transferring cost group to the accessed cost group, other special charges, etc.). In one embodiment, the adjusted PMAC of the transferring cost group is the sum of the PMAC calculated in the current iteration of the processing sequence for the transferring cost group plus any other charges incurred as a result of transferring the items. In another embodiment where the PMAC of the transferring cost group has not been calculated in the current iteration, the adjusted PMAC of the transferring cost group is the sum of the PMAC calculated in the previous iteration of the processing sequence for the transferring cost group plus any other charges incurred as a result of transferring the items. In another embodiment where the PMAC of the transferring cost group has not been calculated in either the current or previous iteration, then the adjusted PMAC of the transferring cost group is the sum of a predetermined value (e.g., the PMAC of the transferring cost group at the end of the previous period) plus any other charges incurred as a result of transferring the items. And in other embodiments, the adjusted PMAC of the transferring cost group may be calculated using a value for the PMAC that is not the most-updated value (e.g., using the PMAC from a previous iteration despite a PMAC from the current iteration being available).

To further illustrate step 424, the processing of transfer receipts for cost group 320 of FIG. 3 will be discussed. To begin, it is appreciated that items are transferred to cost group 320 from cost group 310 (e.g., via transfer 360) and cost group 330 (e.g., via transfer 370). Thus, a transfer receipt will be processed for both cost groups 310 and 330 by calculating the adjusted PMAC for each cost group.

After processing the transfer receipts, a PMAC for the accessed cost group is calculated in step 426. In one embodiment, the PMAC calculation is carried out as explained above with regard to step 230 of FIG. 2. As such, the adjusted PMAC for each transferring cost group calculated in step 424 is used in the PMAC calculation for the accessed cost group in step 426. Once the PMAC for the accessed cost group is calculated, the PMAC is assigned to transfer shipments in step 428 for use in later PMAC calculations.

As shown in FIG. 4B, a determination is made in step 430 as to whether another cost group exists in the cost group sequence for which a PMAC calculation has not yet been performed in the current iteration. If another cost group exists in the cost group sequence for which a PMAC calculation has not yet been performed, then the next cost group in the cost group sequence is accessed in step 432. Thereafter, steps 424-430 are performed for the next cost group.

Figure 4C:
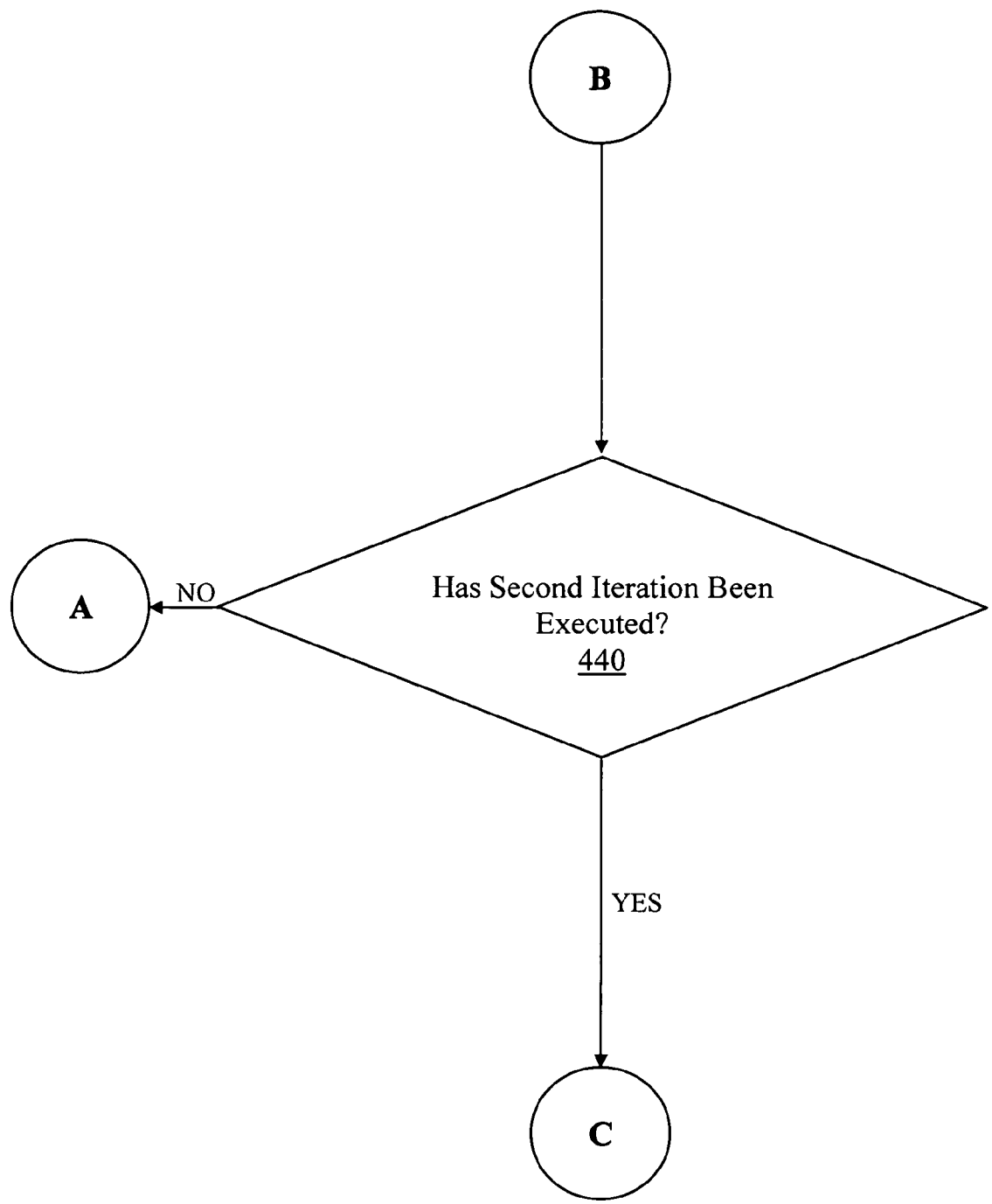
FIG. 4C shows a portion of a computer-implemented process for bypassing tolerance verification before the second iteration has been executed in accordance with one embodiment of the present invention.

However, if another cost group is found not to exist in step 430, then a determination is made in step 434 as to whether another cost group set exists in the cost group set sequence comprising cost groups for which a PMAC calculation has not yet been performed in the current iteration. If another cost group set exists in the cost group set sequence comprising cost groups for which a PMAC calculation has not yet been performed in the current iteration, then the next cost group set in the cost group set sequence is accessed in step 436. Thereafter, steps 422-434 are performed for the next cost group set. However, if another cost group set is found not to exist in step 434, then step 440 of FIG. 4C is performed.

In general, tolerance verification requires at least two iterations. Accordingly, FIG. 4C shows a portion of process 400 for bypassing tolerance verification before the second iteration has been executed in accordance with one embodiment of the present invention. As such, step 440 involves making a determination as to whether a second iteration has been executed. If a second iteration has not been executed, then step 420 of FIG. 4B is performed. If a second iteration has been executed, then step 450 of FIG. 4D is performed.

Figure 4D:
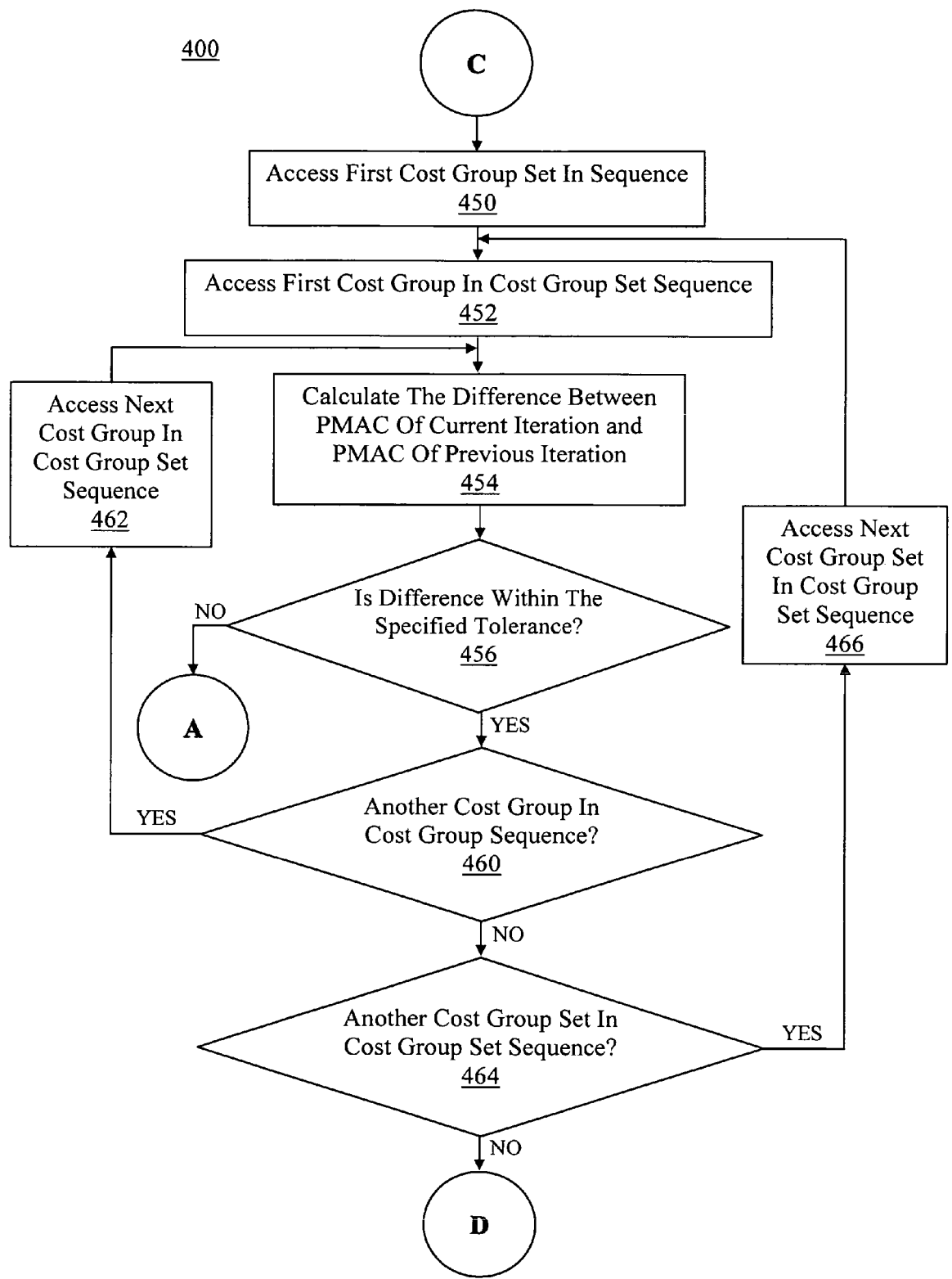
FIG. 4D shows a portion of a computer-implemented process for performing tolerance verification for a plurality of cost groups between which a transferable item is transferred in accordance with one embodiment of the present invention.

FIG. 4D shows a portion of process 400 for performing tolerance verification for a plurality of cost groups between which a transferable item is transferred in accordance with one embodiment of the present invention. As shown in FIG. 4D, step 450 involves accessing the first cost group set in the cost group set sequence similar to that discussed above with respect to step 420. After accessing the first cost group set, the first cost group in the first cost group set is accessed in step 452 similar to that discussed above with respect to step 422.

As shown in FIG. 4D, the difference between the PMAC of the current iteration and the PMAC of the previous iteration is calculated for the accessed cost group in step 454. Thereafter, a determination is made in step 456 as to whether the difference is within a specified tolerance. In one embodiment, the tolerance may be supplied by a user of a computer system performing process 400. In another embodiment, the tolerance may be dynamically generated by the computer system or computer-readable code performing process 400. If the difference is not within the specified tolerance, then step 420 of FIG. 4B is performed. However, if the difference is within the specified tolerance, then step 460 is performed.

A determination is made in step 460 as to whether another cost group exists in the cost group sequence for which a tolerance verification has not yet been performed in the current iteration. If another cost group exists in the cost group sequence for which a tolerance verification has not yet been performed, then the next cost group in the cost group sequence is accessed in step 462. Thereafter, steps 454-460 are performed for the next cost group.

However, if another cost group is found not to exist in step 460, then a determination is made in step 464 as to whether another cost group set exists in the cost group set sequence comprising cost groups for which a tolerance verification has not yet been performed in the current iteration. If another cost group set exists in the cost group set sequence comprising cost groups for which a tolerance verification has not yet been performed in the current iteration, then the next cost group set in the cost group set sequence is accessed in step 466. Thereafter, steps 452-464 are performed for the next cost group set. However, if another cost group set is found not to exist in step 464, then step 470 of FIG. 4E is performed.

Figure 4E:
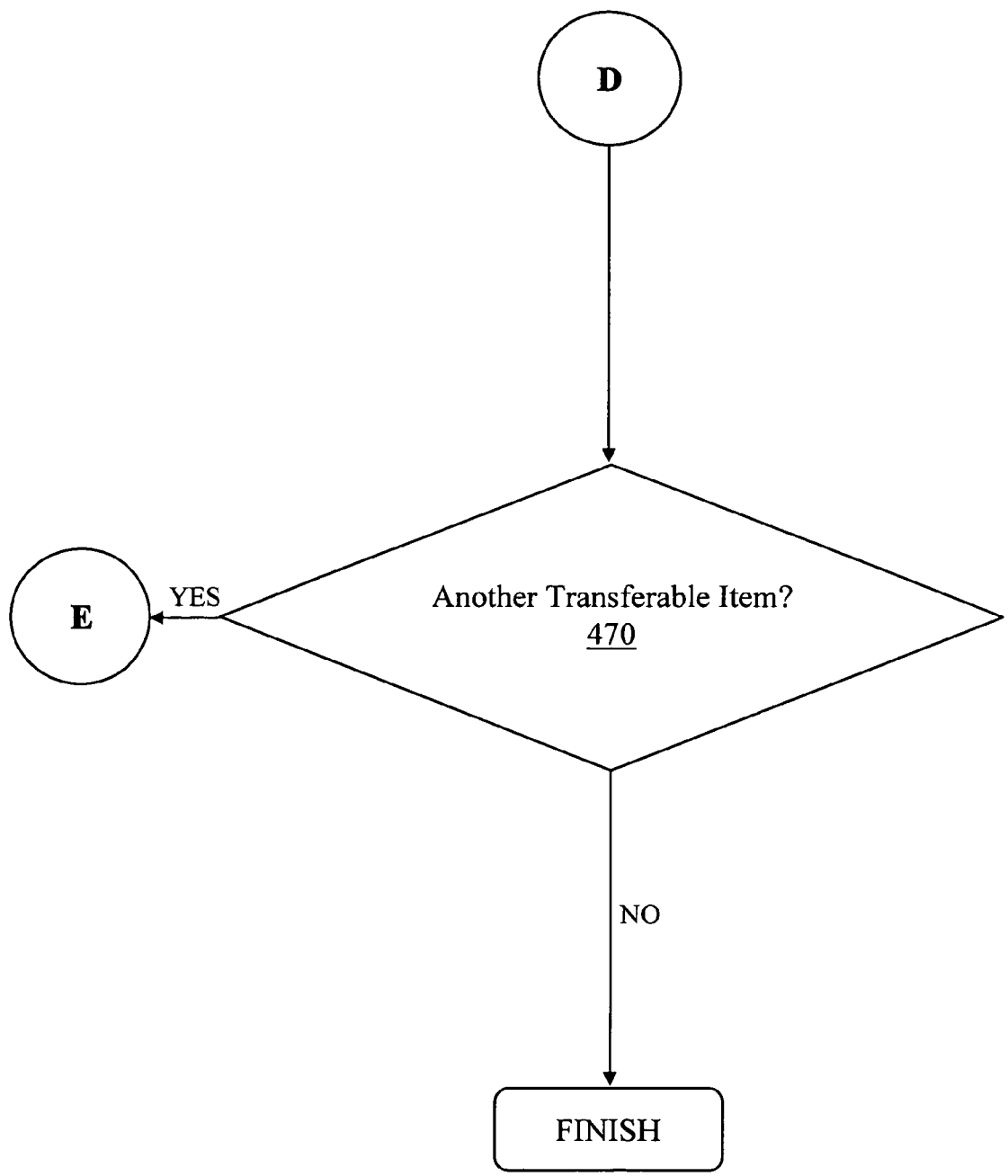
FIG. 4E shows a portion of a computer-implemented process for repeating the determination of absorption costs for transfers between a plurality of cost groups of a business operation for another transferable item in accordance with one embodiment of the present invention.

FIG. 4E shows a portion of process 400 for repeating the determination of absorption costs for transfers between a plurality of cost groups of a business operation for another transferable item in accordance with one embodiment of the present invention. As such, step 470 involves making a determination as to whether another transferable item exists. If another transferable item exists, then step 404 of FIG. 4A is performed. If another transferable item does not exist, then process 400 ends.

FIG. 5 shows exemplary computer system 500 upon which embodiments of the present invention may be implemented. With reference to FIG. 5, portions of the present invention are comprised of computer-readable and computer-executable instructions that reside, for example, in computer system 500 which may be used as a part of a general purpose computer network (not shown). It is appreciated that computer system 500 of FIG. 5 is merely exemplary. As such, the present invention can operate within a number of different computer systems including general-purpose computer systems, embedded computer systems, laptop computer systems, hand-held computer systems, and stand-alone computer systems.

In the present embodiment, computer system 500 includes an address/data bus 502 for conveying digital information between the various components, a central processor unit (CPU) 504 coupled to bus 502 for processing the digital information and instructions, a volatile main memory 506 coupled to bus 502 comprised of volatile random access memory (RAM) for storing the digital information and instructions, and a non-volatile read only memory (ROM) 508 coupled to bus 502 for storing information and instructions of a more permanent nature. In addition, computer system 500 may also include a data storage device 510 (e.g., a magnetic, optical, floppy, tape drive, etc.) coupled to bus 502 for storing larger amounts of data. It should be noted that the software program for performing the improved method for determining absorption costs for transfers between inventory sites of a business operation of the present invention may be stored in main memory 506, ROM 508, storage device 510, registers within processor 504 (not shown), and/or in an external storage device (not shown).

As shown in FIG. 5, computer system 500 may be coupled via bus 502 to an optional display device 512 (e.g., a CRT monitor, LCD monitor, etc.) for displaying information received from computer system 500. An optional input device 514 (e.g., an alphanumeric keyboard) may also be coupled to computer system 500 via bus 502 for communicating information and command selections to processor 504. Cursor control device 516 (e.g., a mouse, trackball, light pen, etc.) may also be coupled to computer system 500 via bus 502 for communicating direction information and command selections to processor 504 and for controlling cursor movement (e.g., on display 512). Additionally, computer system 500 can include a mechanism for emitting an audible signal (not shown).

Computer system 500 may also include a communication interface 518 coupled to bus 502. Communication interface 518 provides a two-way data communication coupling to local network 522 via network link 520. For example, communication interface 518 may be an integrated services digital network (ISDN) device or a modem to provide a data communication connection to a corresponding type of telephone line. As another example, communication interface 518 may be a local area network (LAN) device to provide a data communication connection to a compatible LAN. And as yet another example, network link 520 may comprise a wireless connection between communication interface 518 and local network 522. Regardless of the implementation utilized, communication interface 518 may send and receive electrical, electromagnetic, and/or optical signals that carry digital data streams representing various types of information.

As shown in FIG. 5, network link 520 may provide data communication through one or more networks to other data devices. For example, network link 520 may provide a connection through local network 522 to a host computer 524 or to data equipment operated by internet service provider (ISP) 526. ISP 526 in turn provides data communication services through the worldwide packet data communication network, now commonly referred to as the "internet" 528. Local network 522 and internet 528 may use electrical, electromagnetic, and/or optical signals to convey digital data streams. The signals through the various networks and network link 520, which carry digital data to and from computer system 500, are exemplary forms of carrier waves transporting information.

Accordingly, computer system 500 can send and receive messages through network(s), network link 520, and communication interface 518. For example, server 530 might transmit a requested code for an application program through internet 528, ISP 526, local network 522, and communication interface 518. The received code may be executed by processor 504 upon receipt, and/or be stored in one of the coupled memory devices (e.g., storage device 510, ROM 508, RAM 506, etc.) for later execution.

The preferred embodiment of the present invention, an improved method and system for determining absorption costs for transfers between inventory sites of a business operation, is thus described. While the present invention has been described in particular embodiments, it should be appreciated that the present invention should not be construed as limited by such embodiments, but rather construed according to the following claims.

What is claimed is:

1. A method for determining absorption costs for transfers between a plurality of cost groups of a business operation, one or more computer systems executing the following steps:

determining with a computer system a processing sequence for said plurality of cost groups wherein each cost group comprises an inventory site;

for iteration (n) where n>1, calculating with the computer system a periodic moving average cost of a transferable item for each of said plurality of cost groups according to said processing sequence, wherein said periodic moving average cost comprises a cost incurred when said transferable item is transferred between said plurality of cost groups;

calculating with the computer system a difference between said periodic moving average cost calculated in iteration (n) for each of said plurality of cost groups and a periodic moving average cost calculated in iteration (n−1) for each of said plurality of cost groups; and repeating calculating the periodic moving average cost and calculating a different between the periodic moving average cost calculated in iteration (n) and a periodic moving average cost calculated in iteration (n−1) until said difference is within a specified tolerance.

2. The method of claim 1, wherein said specified tolerance is provided by a user.

3. The method of claim 1, wherein said determining a processing sequence for said plurality of cost groups further comprises:
   defining a plurality of cost group sets comprising said plurality of cost groups;
   establishing a cost group set ordering; and
   establishing a cost group ordering for each of said cost group sets.

4. The method of claim 3, wherein said defining a plurality of cost group sets further comprises:
   creating a first cost group set comprising a plurality of cost groups which have generated only transfer shipments;
   creating a second cost group set comprising a plurality of cost groups which have generated transfer shipments and transfer receipts; and
   creating a third cost group set comprising a plurality of cost groups which have generated only transfer receipts.

5. The method of claim 4, wherein said first cost group is not processed, and wherein said second cost group set is processed first and said third cost group set is processed last.

6. The method of claim 5, wherein said cost groups comprising each cost group set are processed in order of ascending inventory of said transferable item.

7. The method of claim 1, wherein said calculating said periodic moving average cost further comprises:
   processing transfer receipts by determining an adjusted periodic moving average cost of each cost group from which said transferable item is transferred, wherein said determining an adjusted periodic moving average cost further comprises:
     adding a periodic moving average cost calculated in said iteration (n) for each of said cost groups from which said transferable item is transferred to any other charges incurred as a result of transferring said transferable item;
     if said periodic moving average cost calculated in said iteration (n) is not available, then adding said periodic moving average cost calculated in said iteration (n−1) to any other charges incurred as a result of transferring said transferable item; and
     if neither said periodic moving average cost calculated in said iteration (n) nor said periodic moving average cost calculated in said iteration (n−1) is available, then adding a pre-determined value to any other charges incurred as a result of transferring said transferable item; and
   calculating said periodic moving average cost utilizing a plurality of said adjusted periodic moving average costs.

8. A computer-usable medium having computer-readable program code stored thereon which, when executed by a computer system, causes the computer system to determine absorption costs for transfers between a plurality of cost groups by:
   determining a processing sequence for said plurality of cost groups wherein each cost group comprises an inventory site;
   for iteration (n) where n>1, calculating a periodic moving average cost of a transferable item for each of said plurality of cost groups according to said processing sequence, wherein said periodic moving average cost comprises a cost incurred when said transferable item is transferred between said plurality of cost groups;
   calculating a difference between said periodic moving average cost calculated in iteration (n) for each of said plurality of cost groups and a periodic moving average cost calculated in iteration (n−1) for each of said plurality of cost groups; and
   repeating calculating the periodic moving average cost and calculating a different between the periodic moving average cost calculated in iteration (n) and a periodic moving average cost calculated in iteration (n−1) until said difference is within a specified tolerance.

9. The computer-usable medium of claim 8, wherein said specified tolerance is provided by a user.

10. The computer-usable medium of claim 8, wherein said determining a processing sequence for said plurality of cost groups further comprises:
    defining a plurality of cost group sets comprising said plurality of cost groups;
    establishing a cost group set ordering; and
    establishing a cost group ordering for each of said cost group sets.

11. The computer-usable medium of claim 10, wherein said defining a plurality of cost group sets further comprises:
    creating a first cost group set comprising a plurality of cost groups which have generated only transfer shipments;
    creating a second cost group set comprising a plurality of cost groups which have generated transfer shipments and transfer receipts; and
    creating a third cost group set comprising a plurality of cost groups which have generated only transfer receipts.

12. The computer-usable medium of claim 11, wherein said first cost group is not processed, and wherein said second cost group set is processed first and said third cost group set is processed last.

13. The computer-usable medium of claim 12, wherein said cost groups comprising each cost group set are processed in order of ascending inventory of said transferable item.

14. The computer-usable medium of claim 8, wherein said calculating said periodic moving average cost further comprises:
    processing transfer receipts by determining an adjusted periodic moving average cost of each cost group from which said transferable item is transferred, wherein said determining an adjusted periodic moving average cost further comprises:
      adding a periodic moving average cost calculated in said iteration (n) for each of said cost groups from which said transferable item is transferred to any other charges incurred as a result of transferring said transferable item;
      if said periodic moving average cost calculated in said iteration (n) is not available, then adding said periodic moving average cost calculated in said iteration (n−1) to any other charges incurred as a result of transferring said transferable item; and
      if neither said periodic moving average cost calculated in said iteration (n) nor said periodic moving average cost calculated in said iteration (n−1) is available, then adding a pre-determined value to any other charges incurred as a result of transferring said transferable item; and
    calculating said periodic moving average cost utilizing a plurality of said adjusted periodic moving average costs.

15. A computer system comprising a processor coupled to a bus and a memory coupled to said bus, wherein said memory comprises instructions that when executed on said processor cause the system to determine absorption costs for transfers between a plurality of cost groups by:
    determining a processing sequence for said plurality of cost groups wherein each cost group comprises an inventory site;

for iteration (n) where n>1, calculating a periodic moving average cost of a transferable item for each of said plurality of cost groups according to said processing sequence, wherein said periodic moving average cost comprises a cost incurred when said transferable item is transferred between said plurality of cost groups;

calculating a difference between said periodic moving average cost calculated in iteration (n) for each of said plurality of cost groups and a periodic moving average cost calculated in iteration (n−1) for each of said plurality of cost groups; and repeating calculating the periodic moving average cost and calculating a different between the periodic moving average cost calculated in iteration (n) and a periodic moving average cost calculated in iteration (n−1) until said difference is within a specified tolerance.

16. The system of claim 15, wherein said specified tolerance is provided by a user.

17. The system of claim 15, wherein said determining a processing sequence for said plurality of cost groups further comprises:

defining a plurality of cost group sets comprising said plurality of cost groups;

establishing a cost group set ordering; and establishing a cost group ordering for each of said cost group sets.

18. The system of claim 17, wherein said defining a plurality of cost group sets further comprises:

absorption costs for transfers between a plurality of cost groups, said method comprising:

determining a processing sequence for said plurality of cost groups;

for iteration (n) where n>1, calculating a periodic moving average cost of a transferable item for each of said plurality of cost groups according to said processing sequence, wherein said transferable item is to be transferred between said plurality of cost groups;

calculating a difference between said periodic moving average cost calculated in iteration (n) for each of said plurality of cost groups and a periodic moving average cost calculated in iteration (n−1) for each of said plurality of cost groups; and repeating said calculating a periodic moving average cost and calculating a difference between said periodic moving average cost calculated in iteration (n) for each of said plurality of cost groups and a periodic moving average cost calculated in iteration (n−1) until said difference is within a specified tolerance.

19. The system of claim 18, wherein said first cost group is not processed, and wherein said second cost group set is processed first and said third cost group set is processed last.

20. The system of claim 19, wherein said cost groups comprising each cost group set are processed in order of ascending inventory of said transferable item.

21. The system of claim 15, wherein said calculating said periodic moving average cost further comprises:

processing transfer receipts by determining an adjusted periodic moving average cost of each cost group from which said transferable item is transferred, wherein said determining an adjusted periodic moving average cost further comprises:

adding a periodic moving average cost calculated in said iteration (n) for each of said cost groups from which said transferable item is transferred to any other charges incurred as a result of transferring said transferable item;

if said periodic moving average cost calculated in said iteration (n) is not available, then adding said periodic moving average cost calculated in said iteration (n−1) to any other charges incurred as a result of transferring said transferable item; and if neither said periodic moving average cost calculated in said iteration (n) nor said periodic moving average cost calculated in said iteration (n−1) is available, then adding a pre-determined value to any other charges incurred as a result of transferring said transferable item; and calculating said periodic moving average cost utilizing a plurality of said adjusted periodic moving average costs.

* * * * *

UNITED STATES PATENT AND TRADEMARK OFFICE
CERTIFICATE OF CORRECTION

PATENT NO. : 7,693,756 B2  
APPLICATION NO. : 11/393135  
DATED : April 6, 2010  
INVENTOR(S) : Veeresha Javli et al.

Page 1 of 1

It is certified that error appears in the above-identified patent and that said Letters Patent is hereby corrected as shown below:

In column 7, line 51, delete "as" and insert -- as a --, therefor.

In column 8, line 23, delete "b )" and insert -- b) --, therefor.

Signed and Sealed this
Nineteenth Day of April, 2011

David J. Kappos
*Director of the United States Patent and Trademark Office*